United States Patent
Woo et al.

(10) Patent No.: US 9,806,556 B2
(45) Date of Patent: Oct. 31, 2017

(54) WIRELESS CHARGING APPARATUS

(71) Applicant: SAMSUNG SDI CO., LTD., Yongin-si, Gyeonggi-do (KR)

(72) Inventors: Seungwon Woo, Yongin-si (KR); Sangil Yi, Yongin-si (KR)

(73) Assignee: Samsung SDI Co., Ltd., Yongin-Si, Gyeonggi-do (KR)

(*) Notice: Subject to any disclaimer, the term of this patent is extended or adjusted under 35 U.S.C. 154(b) by 205 days.

(21) Appl. No.: 14/708,459

(22) Filed: May 11, 2015

(65) Prior Publication Data

US 2016/0204641 A1    Jul. 14, 2016

(30) Foreign Application Priority Data

Jan. 8, 2015  (KR) .................. 10-2015-0002636

(51) Int. Cl.
*H02J 7/02*    (2016.01)
*H02J 7/00*    (2006.01)
*H02J 50/10*   (2016.01)
*H02J 50/50*   (2016.01)

(52) U.S. Cl.
CPC ............ *H02J 7/025* (2013.01); *H02J 7/0052* (2013.01); *H02J 7/0054* (2013.01); *H02J 50/10* (2016.02); *H02J 50/50* (2016.02)

(58) Field of Classification Search
CPC .......... H02J 50/10; H02J 50/50; H02J 7/0052; H02J 7/0054; H02J 7/025
See application file for complete search history.

(56) References Cited

U.S. PATENT DOCUMENTS

| 2011/0187320 | A1  | 8/2011  | Murayama |
| 2011/0241439 | A1  | 10/2011 | Urano    |
| 2014/0306651 | A1* | 10/2014 | Lin ......................... H02J 7/025 320/108 |
| 2015/0303824 | A1* | 10/2015 | Celani .................. H02M 7/217 307/104 |

FOREIGN PATENT DOCUMENTS

JP    2011-160505 A    8/2011
KR    10-2008-0096917 A    11/2008

* cited by examiner

*Primary Examiner* — Vuthe Siek
(74) *Attorney, Agent, or Firm* — Lee & Morse, P.C.

(57) ABSTRACT

A wireless charging apparatus includes a transmitter, and first receiver, and a second receiver. The transmitter wirelessly transmits first power from a charger. The first receiver amplifies first current corresponding to the first power to second current. The second receiver wirelessly receives second power corresponding to the second current. The second power charges a battery of an electronic device, and the first and second receivers are coupled to the electronic device.

14 Claims, 2 Drawing Sheets

WIRELESS CHARGING APPARATUS

CROSS-REFERENCE TO RELATED APPLICATION

Korean Patent Application No. 10-2015-0002636, filed on Jan. 8, 2015, and entitled, "Wireless Charging Apparatus," is incorporated by reference herein in its entirety.

BACKGROUND

1. Field

One or more embodiments herein relate to a wireless charging apparatus.

2. Description of the Related Art

Wireless charging refers to wirelessly charging the battery of an electronic product, e.g., a portable electronic device. Wireless charging is performed by placing the battery, or device, on a charger (e.g., a charging pad) without establishing a physical connection to a separate charging adapter or power cable. Wireless charging has also been referred to as non-contact charging.

One type of wireless charging is performed in an electromagnetically inductive manner in one-to-one correspondence between the primary coil of the device and the secondary coil of the charger. However, wireless charging may be especially difficult for some types of devices and/or under some conditions. For example, mobile phones designed for use in a mountainous areas or for military purposes may have battery covers with a thickness that exceeds a wireless charging range. In these and other situations, wireless charging may be difficult to perform.

SUMMARY

In accordance with one or more embodiments, a wireless charging apparatus includes a transmitter to wirelessly transmit first power from a charger; a first receiver to amplify first current corresponding to the first power to second current; and a second receiver to wirelessly receive second power corresponding to the second current, wherein the second power is to charge a battery of an electronic device and wherein the first and second receivers are coupled to the electronic device. The second receiver may be inside a cover of the electronic device, and the first receiver may be coupled to an outer surface of the cover. The transmitter may include a transmission coil to transmit the first power to the first receiver.

The first receiver may include an input circuit to induce the first current based on the first power; an amplifier electrically connected to the input circuit to amplify the first current to the second current, where the second current may be greater than the first current; and an output circuit to transmit the second power to the second receiver based on the second current.

The input circuit may include an input coil to the first current based on electromagnetic induction with the transmission coil; and one or more capacitors electrically connected to the input coil, wherein the one or more capacitors are to perform a frequency-matching operation between the input coil and transmission coil.

The amplifier may include a first coil electrically connected to the input circuit; and a second coil facing the first coil, wherein the second coil has a number of turns greater than first coil and is electrically connected to the output circuit. The number of turns of the second coil may be twice a number of turns of the first coil.

The output circuit may include an output coil to induce the second power to be received by the second receiver; and one or more output capacitors to store the second power corresponding to the second current, the one or more capacitors electrically connected to the output coil.

The second receiver may include a reception coil to receive the second power transmitted from the first receiver. The second receiver may be electrically connected to the battery to charge the battery based on the second power.

In accordance with one or more other embodiments, an apparatus includes an input circuit to wirelessly receive first power from a charger; an amplifier to amplify the first power to a second power; and an output circuit to wirelessly transmit the second power to a receiver of a device, wherein an amplification factor of the amplifier is based on a predetermined distance between the charger and the receiver of the electronic device and wherein the second power has a level sufficient to charge a battery of the device.

The predetermined distance between the charger and the second receiver may be less than a distance between the charger and the second receiver. The predetermined distance between the charger and the second receiver may be equal to a distance between the charger and the second receiver. The predetermined distance may correspond to an effective wireless charging range. The effective wireless charging range may be greater than a wireless charging range between the charger and the receiver of the device when the charger and receiver are coupled without the amplifier.

The second power may have a level sufficient to charge a battery of the device at a predetermined rate. The level of the second power predetermined distance between the charger and the second receiver may be less than a distance between the charger and the second receiver may be based on the following equation:

$$P = P_{second\ level} - P_D$$

where $P_{second\ level}$ is the second power, D is a distance between the apparatus and the receiver of the electronic device, $P_D$ is the attenuation of power that occurs in distance D, and P is power for charging the battery of the electronic device at the predetermined rate. The apparatus may be electromagnetically coupled to each of the charger and device receiver.

In accordance with one or more other embodiments, an electronic device includes a first receiver to wirelessly receive first power from a charger; an amplifier to amplify the first power to a second power; an output circuit to wirelessly transmit the second power; and a second receiver to receive the second power, wherein an amplification factor of the amplifier is based on a predetermined distance between the charger and the second receiver and wherein the second power has a level sufficient to charge a battery of a device at a predetermined rate.

The predetermined distance between the charger and the second receiver may be less than a distance between the charger and the second receiver. The predetermined distance may correspond to an effective wireless charging range. The effective wireless charging range may be greater than a wireless charging range between the charger and the first receiver when the charger and first receiver are coupled without the amplifier.

The charger maybe electromagnetically coupled to the first receiver, and the output circuit be electromagnetically coupled to the second receiver. A cover of the device may be between the output circuit and the second receiver.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
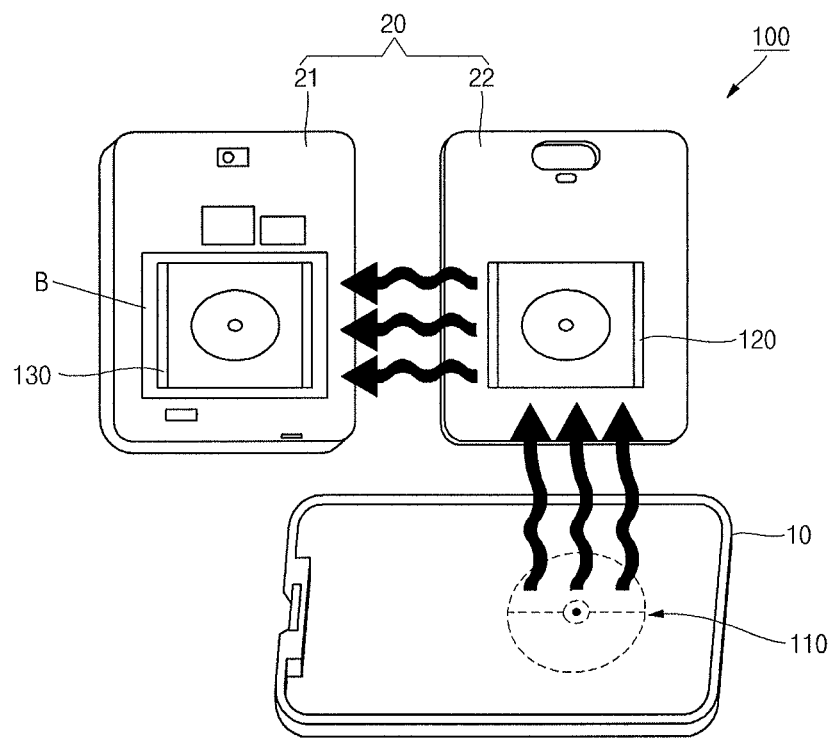
FIG. 1 illustrates an embodiment of a wireless charging apparatus.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

In accordance with one or more embodiments described herein, a battery to be charged may include, for example, a rechargeable secondary battery (e.g., a lithium ion battery, a lithium polymer battery, or a lithium ion polymer battery), a small-sized battery (e.g., for use in smart phones, cellular phones, notebook computers, or digital cameras), and/or a large-sized battery for use in electric vehicles, hybrid vehicles, electric bicycles, or electric motorcycles.

Figure 2:
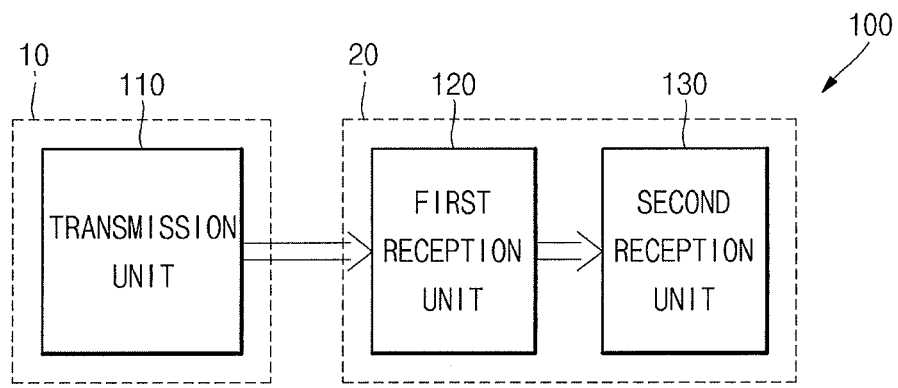
FIG. 2 illustrates a more detailed embodiment of the apparatus in FIG. 1.
Figure 3:
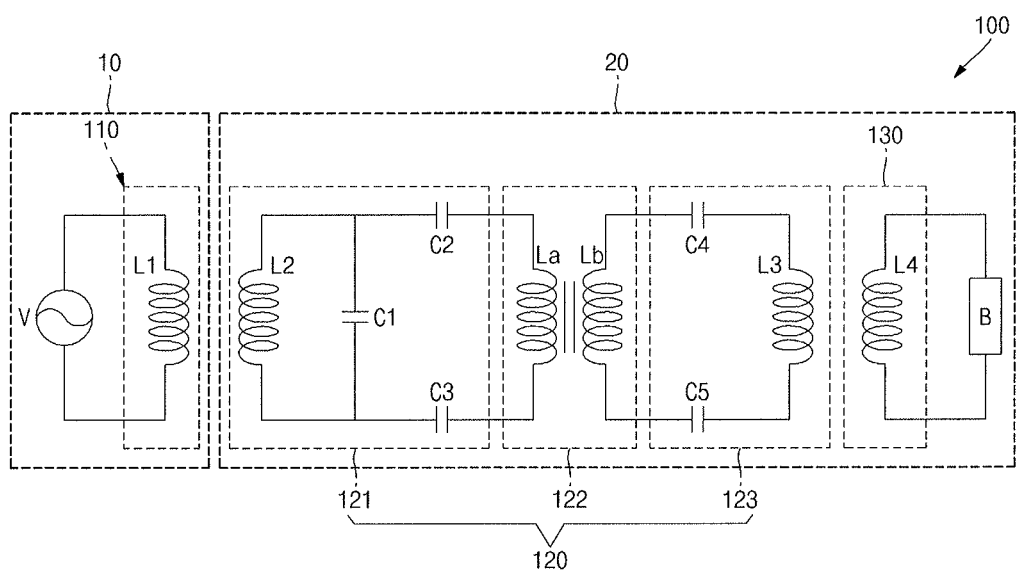
FIG. 3 illustrates a circuit embodiment of the wireless charging apparatus.

FIGS. 1 to 3 illustrate embodiments of a wireless charging apparatus 100 which includes a transmission unit 110, a first reception unit 120, and a second reception unit 130. The transmission unit 110 transmits power for charging a battery B of an electronic device 20. The first reception unit 120 amplifies first current for the power transmitted from the transmission unit 110 and transmits the amplified current to the second reception unit 130. The second reception unit 130 charges a battery B based on the current induced by the first reception unit 120. The wireless charging apparatus 100 may perform wireless charging when the electronic device 20 incorporating the battery B is placed within range of a wireless charger 10. Thus, the battery B may be charged without establishing a mechanical or physical connection between the electronic device 20 and a charger using, for example, a power cable.

The transmission unit 110 may be mounted in the wireless charger 10 for supplying charging power to the battery B. The first reception unit 120 and the second reception unit 130 may be mounted in the electronic device 20 incorporating the battery B. The electronic device 20 may include a main body 21 in which the battery B is mounted and a cover 22 covering one surface of the main body 21 to protect the battery B from external surroundings. The first reception unit 120 may be mounted on an outer surface of the cover 22 and the second reception unit 130 may be mounted on the battery B. For example, the second reception unit 130 may be positioned inside the cover 22 and the first reception unit 120 may be positioned outside the cover 22.

The transmission unit 110 may include a transmission coil L1 electrically connected to a power supply V of the wireless charger 10. The transmission unit 10 transmits first power from the power supply V to the first reception unit 120.

The first reception unit 120 includes an input unit 121, an amplification unit 122, and an output unit 123. The input unit 121 receives the first power transmitted from the transmission unit 110 as an input. The amplification unit 122 amplifies first current induced by electromagnetic induction between the transmission coil L1 of the transmission unit 110 and the input coil L2 of the input unit 121. The amplified current is transmitted to the second reception unit 130 through an output coil L3 of output unit 123.

The input unit 121 includes the input coil L2 and one or more capacitors. The input coil L2 performs electromagnetic induction with respect to the transmission coil L1 when the input coil L2 comes within range of the transmission coil L1. The one or more capacitors performs a frequency-matching operation between the reception coil L2 and the transmission coil L1. For example, when the electronic device 20 comes near (e.g., within wireless range of) the transmission unit 110 of the wireless charger 10, the reception coil L2 of the input unit 121 applies first current generated based on the electromagnetic induction to the amplification unit 122.

As illustrated in FIG. 3, the one or more capacitors may include a first input capacitor C1 connected in parallel to the reception coil L2, a second input capacitor C2 electrically connected to a first electrode of the first input capacitor C1, and a third input capacitor C3 electrically connected to a second electrode of the first input capacitor C1.

In another embodiment, the input unit 121 may include only one capacitor (e.g., the first input capacitor C1) for performing frequency-matching between the reception coil L2 and the transmission coil L1. Frequency-matching with the transmission unit 110 may be achieved by, for example, adjusting the capacitance value of the first input capacitor C1. In an embodiment where the input unit 121 includes a plurality of input capacitors, frequency-matching may be more easily performed than in the case where the only one capacitor is used in the input unit 121 for performing frequency matching. In any case, the first current induced by the matched frequency between the transmission unit 110 and the input unit 121 may flow through the input unit 121.

The amplification unit 122 includes a first coil La and a second coil Lb. The first coil La is electrically connected to the input unit 121 and applies the first current as an input. The second coil Lb is electrically connected to the output unit 123, faces the first coil La, and amplifies the current applied to the first coil La. The first coil La may be connected in parallel to the reception coil L2 and the first input capacitor C1.

The first coil La may have a first electrode electrically connected to the second input capacitor C2 and a second electrode electrically connected to the third input capacitor C3. The second input capacitor C2 is electrically connected between the first electrode of the reception coil L2 and the first electrode of the first coil La. The third input capacitor C3 is electrically connected between the second electrode of the reception coil L2 and the second electrode of the first coil La.

The number of turns of the first coil La may be less than the number of turns of the second coil Lb. Since the number of turns of the second coil Lb is greater than the number of turns of the first coil La, the second current induced to the second coil Lb is greater than the first current applied to the first coil La. The number of turns of the second coil Lb may be, for example, twice the number of turns of the first coil La, and the second current induced through the second coil Lb and applied to the output unit 123 may be twice the first current. The number of turns in the first and second coils may correspond to a different ratio in another embodiment.

The output unit 123 includes an output coil L3, a fourth capacitor C4, and a fifth capacitor C5. The output coil L3 is connected in parallel to the second coil Lb of the amplification unit 122. The fourth capacitor C4 electrically connects the first electrode of the second coil Lb and the first electrode of the output coil L3. The fifth capacitor C5 electrically connects the second electrode of the second coil Lb and the second electrode of the output coil L3. The fourth capacitor C4 and the fifth capacitor C5 may store a voltage for the second current applied through the second coil Lb. The output unit 123 transmits the second current amplified by the amplification unit 122 to the second reception unit 130 through the output coil L3.

Since the first reception unit 120 amplifies the first current applied through the input coil L2 and applies the amplified current to the output unit 123, the amplified second current may be easily transmitted to the second reception unit 130 positioned inside the cover 22, even when the cover of the electronic device 20 has an increased thickness that otherwise would adversely affect or prevent wireless charging. Thus, wireless charging of the battery B of the electronic device 20 may be reliably performed using the first reception unit 120.

In one embodiment, the first reception unit 120 is mounted on an outer surface of the cover 22 of the electronic device 20. As a result, the distance between the first reception unit 120 and the transmission unit 110 may be reduced, thereby easily achieving electromagnetic induction between the transmission unit 110 and the first reception unit 120. In another embodiment, the first reception unit 120 may mounted on an inner surface of the cover 22.

The output coil L3 of the output unit 123 may face a reception coil L4 of the second reception unit 130. In this case, the battery B may be charged by second power for the second current induced by electromagnetic induction between the output coil L3 and the reception coil L4. The second reception unit 130 may be electrically connected to the battery B.

By way of summary and review, one type of wireless charging is performed in an electromagnetically inductive manner in one-to-one correspondence between the primary coil of an electronic device and the secondary coil of the charger. However, wireless charging may be especially difficult for some types of devices and/or under some conditions. For example, mobile phones designed for use in a mountainous areas or for military purposes may have battery covers with a thickness that exceeds a wireless charging range. In these situations, wireless charging may be difficult to perform.

In accordance with one or more of the aforementioned embodiments, the wireless charging apparatus 100 includes a first reception unit 120 and a second reception unit 130. The first reception unit is mounted on the outer surface of the cover 22 and in the main body 21 of the electronic device 20. The second reception unit 130 is mounted on the battery B positioned inside the cover 22 of the electronic device 20. Therefore, first current of power transmitted from the transmission unit 110 is amplified in the first reception unit 120. The amplified current is then transmitted to the second reception unit 130.

Thus, the wireless charging range is effectively increased. As a result, wireless battery charging may be reliably performed even when, for example, the distance between the battery B and the wireless charger exceeds the wireless charging range of the charger taken alone, e.g., if the first reception unit 120 were not present. In another embodiment, the first reception unit 120 and the second reception unit 130 may be mounted inside the cover 22 of the electronic device, or both of these reception units 120 and 130 may be mounted outside of the cover 22.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A wireless charging apparatus, comprising:
   a transmitter to wirelessly transmit first power from a charger;
   a first receiver to amplify first current corresponding to the first power to second current; and
   a second receiver to wirelessly receive second power corresponding to the second current, wherein the second power is to charge a battery of an electronic device, wherein the first and second receivers are coupled to the electronic device and the transmitter is external to the electronic device, and wherein a distance between the second receiver and the transmitter exceeds a wireless charging range of the second receiver.

2. The apparatus as claimed in claim 1, wherein:
   the second receiver is inside a cover of the electronic device, and
   the first receiver is coupled to an outer surface of the cover.

3. The apparatus as claimed in claim 1, wherein the transmitter includes a transmission coil to transmit the first power to the first receiver.

4. The apparatus as claimed in claim 3, wherein the first receiver includes:
   an input circuit to induce the first current based on the first power;
   an amplifier electrically connected to the input circuit to amplify the first current to the second current, the second current greater than the first current; and
   an output circuit to transmit the second power to the second receiver based on the second current.

5. The apparatus as claimed in claim 4, wherein the input circuit includes:
   an input coil to apply the first current based on electromagnetic induction with the transmission coil to the amplifier; and
   one or more capacitors electrically connected to the input coil, wherein the one or more capacitors are to perform a frequency-matching operation between the input coil and the transmission coil.

6. The apparatus as claimed in claim 4, wherein amplifier includes:
   a first coil electrically connected to the input circuit; and
   a second coil facing the first coil, wherein the second coil has a number of turns greater than first coil and is electrically connected to the output circuit.

7. The apparatus as claimed in claim 6, wherein the number of turns of the second coil is twice a number of turns of the first coil.

8. The apparatus as claimed in claim 4, wherein the output circuit includes:
an output coil to induce the second power to be received by the second receiver; and
one or more output capacitors to store the second power corresponding to the second current, the one or more capacitors electrically connected to the output coil.

9. The apparatus as claimed in claim 4, wherein the second receiver includes a reception coil to receive the second power transmitted from the first receiver.

10. The apparatus as claimed in claim 9, wherein the second receiver is electrically connected to the battery to charge the battery based on the second power.

11. An apparatus, comprising:
a first receiver to wirelessly receive first power from a transmitter; and
a second receiver to wirelessly receive second power from the first receiver,
wherein the first receiver and the second receiver are coupled to an electronic device, the first receiver to convert the first power to the second power, wherein the second receiver is coupled to a battery of the electronic device, and wherein a distance between the second receiver and the transmitter exceeds a wireless charging range of the second receiver.

12. The apparatus as claimed in claim 11, wherein:
the second receiver is inside a cover of the electronic device, and
the first receiver is on an outer surface of the cover.

13. The apparatus as claimed in claim 11, wherein the first receiver includes:
an input circuit to induce a first current based on the first power;
an amplifier, electrically connected to the input circuit, to amplify the first current to a second current greater than the first current; and
an output circuit to transmit the second power to the second receiver based on the second current.

14. The apparatus as claimed in claim 13, wherein the input circuit includes:
an input coil to apply the first current based on electromagnetic induction with the transmission coil to the amplifier; and
one or more capacitors electrically connected to the input coil, wherein the one or more capacitors are to perform a frequency-matching operation between the input coil and the transmission coil.

\* \* \* \* \*